Patented Dec. 18, 1951

2,579,061

UNITED STATES PATENT OFFICE 2,579,061

COPOLYMERS OF HYDROGEN CYANIDE AND THEIR PREPARATION

David W. Woodward, Wilmington, Del., assignor to E. I. du Pont de Nemours & Company, Wilmington, Del., a corporation of Delaware No Drawing. Application July 10, 1950, Serial No. 173,003

21 Claims. (Cl. 260—85.7)

This invention relates to new polymeric materials and more particularly to copolymers of hydrogen cyanide and to methods for their preparation.

Reactions of hydrogen cyanide with unsaturated organic compounds to produce nitriles, cyanohydrins, formamides, substituted amines and many other compounds are well known. These reactions are in general catalyzed by ionic catalysts such as acids and bases or by acidic salt catalysts of the Friedel-Crafts type and they yield simple monomeric adducts or condensation compounds characterized by being liquids or crystalline solids having molecular weights equal to or less than that of the combined reactants. In the few cases where a plurality of the same type of molecules participate in the reaction, the products are characterized by the presence of not more than a single molecule of one of the specific reactants. But the true copolymerization of hydrogen cyanide with an ethylenically unsaturated polymerizable compound wherein a plurality of molecules of each of the specific reactants participate in the reaction has not hitherto been accomplished.

It is an object of this invention to provide new polymeric materials and methods for their preparation. A further object is to provide copolymers of hydrogen cyanide and methods for their preparation. Other objects will appear hereinafter.

These objects are accomplished by the following invention of a copolymer of from 0.5 to 50 mole percent of hydrogen cyanide with from 99.5 to 50 mole percent of an ethylenically unsaturated monomer which undergoes addition polymerization. It has now been found that hydrogen cyanide can be copolymerized with ethylenically unsaturated compounds which are capable of undergoing addition polymerization in the presence of free radical-generating polymerization initiators. The products of this invention are linear polymers built up of a plurality of molecules of both hydrogen cyanide and of the ethylenically unsaturated polymerizable compound, and are characterized by having ketimino, $$-\underset{\underset{NH}{\|}}{C}-$$

groups as an integral part of the polymer chain. That is, the imino (=NH) groups are directly attached through a double covalent bond to a carbon atom of the main polymer carbon chain. In addition to these recurring ketimino structural units, the copolymers contain as recurring structural units the ethylenically unsaturated polymerizable monomers which have undergone addition polymerization across the ethylenic double bond.

The copolymers of this invention range from oily liquids to waxy solids, contain from 0.1% to 25% nitrogen, have molecular weights within the range of 200 to 10,000 (determined ebullioscopically or calculated from intrinsic viscosity measurements), and are soluble in aromatic hydrocarbon solvents. The copolymers of higher molecular weight in this range can be formed into self-supporting films.

The copolymers of this invention are conveniently prepared by contacting hydrogen cyanide with the ethylenically unsaturated monomers in proportions of 1 to 200 moles, preferably 5 to 60 moles, of the ethylenically unsaturated monomer per mole of hydrogen cyanide, under superatmospheric pressure ranging from 500 to 150,000 lb./sq. in., preferably 4,500 to 45,000 lb./sq. in., at temperatures of from 0° C. to 400° C., and preferably between 30° and 250° C., in the presence of a free radical-generating polymerization initiator. The polymerization is carried out in the absence of a Friedel-Crafts type catalyst. The process can be carried out either as a batch, semi-continuous, or continuous operation.

The concentration of free radical-generating polymerization initiator that can be used in the process of this invention varies over wide ranges. Amounts of free radical-generating initiators ranging from 0.1% to 100% of the weight of the hydrogen cyanide are operable. Especially desirable results are obtained with concentrations of from 1% to 20% of the weight of the hydrogen cyanide.

The time required for preparing the copolymers of this invention varies over wide limits depending upon various factors such as the particular initiator, the reaction temperature and the particular method of polymerization being employed. In batch polymerizations reaction times ranging from ¼ to 100 hours can be used, although times ranging from 1 to 20 hours are usually most satisfactory. In continuous polymerization processes reaction times ranging from 1 second to 1 hour, preferably from ½ minute to 20 minutes are satisfactory.

The following examples in which the parts given are by weight unless otherwise specified serve to illustrate but not to limit the process of this invention.

Example I

A silver-lined pressure reactor is filled to one-fourth of its volume with 100 parts of benzene and to this is added 2 parts of hydrogen cyanide and 1 part of di(tertiary-butyl) peroxide. The reactor is closed, cooled to −70° C. and evacuated, warmed to 20° C. and charged with 130 parts of ethylene to give a pressure of 1,500 lb./sq. in. The reaction vessel is shaken, heated to 135° C., and the pressure increased to 13,000 lb./sq. in. by the addition of more ethylene. The reaction is continued for 8 hours while intermittently repressuring to 13,000 lb./sq. in. with ethylene.

After cooling and venting the reactor, the product is removed and dried, 40 parts of a light tan solid being obtained. Extraction of this solid with diethyl ether yields 1 part of a nearly colorless wax containing 1.36% nitrogen and having an average molecular weight of 500 (determined by boiling point elevation of benzene solution). Extraction of the residue from the ether extraction with benzene removes 6 parts of a colorless wax containing 0.8% nitrogen and having an average molecular weight of 3,050. The residue, amounting to 33 parts, is a light tan wax which is soluble in hot xylene and contains 0.43% nitrogen. This wax has an intrinsic viscosity (as defined in U. S. Patent 2,130,948) determined at 85° C. in xylene solution at a concentration of 0.25 g. per 100 ml. of solution, of 0.53.

Example II

In another copolymerization carried out by the general process of Example I the reactor is charged with 100 parts of benzene, 10 parts of hydrogen cyanide, 5 parts of di(tertiary-butyl) peroxide, 0.5 part of copper powder, and 130 parts of ethylene. The polymerization is carried out at 130° C. for 8 hours under 12,000 lb./sq. in. ethylene pressure.

Filtration of the reaction mixture at room temperature and evaporation of the filtrate yields 6 parts of light brown wax containing 6.2% nitrogen and having a molecular weight of 535. These data indicate an ethylene/hydrogen cyanide mole ratio of 7.5/1 and a nitrogen/molecule ratio of 2.4/1. The solid product separated from the reaction mixture during the original filtration consists, after drying, of 20 parts of brown wax. Ether extraction of this wax yields 3 parts of light brown wax containing 4.0% nitrogen and having a molecular weight of 1,000. These data indicate an ethylene/hydrogen cyanide mole ratio of 12/1 and a nitrogen/molecule ratio of 2.9/1. The residue remaining after ether extraction consists of 17 parts of light brown wax soluble in hot benzene, containing 2.9% nitrogen, and having an average molecular weight of 2,150. These data indicate an ethylene/hydrogen cyanide mole ratio of 18/1 and a nitrogen/molecule ratio of 4.5/1.

Example III

In another copolymerization similar to that of Example I a reaction vessel is charged with 100 parts of benzene, 15 parts of hydrogen cyanide, 3 parts of di(tertiary-butyl) peroxide, 0.5 part of precipitated silver (6%) on calcium carbonate, and 130 parts of ethylene. The polymerization is carried out at 130° C. under 13,000 lb./sq. in. ethylene pressure for 5 hours.

The reaction mixture is diluted with 100 parts of benzene, filtered hot, and cooled to 10° C. whereupon a precipitate forms. This precipitate is isolated by filtration, and after drying, there is obtained 4 parts of wax containing 5.4% nitrogen. Evaporation of the filtrate yields 2 parts of wax containing 8.4% nitrogen.

Example IV

In another copolymerization similar to that of Example I the reactor is charged with 100 parts of benzene, 5 parts of hydrogen cyanide, and 2.5 parts of 1,1'-azo-dicyclohexanecarbonitrile. The reaction is carried out at a temperature of 100° C. under an ethylene pressure of 11,000 lb./sq. in. for 8 hrs.

The reaction mixture is dissolved in 200 parts of boiling benzene, filtered, and the filtrate cooled to 20° C. The polymer which separates on cooling is removed by filtration and dried, yielding 22 parts of a waxy copolymer of hydrogen cyanide and ethylene containing 2.4% nitrogen and having an average molecular weight of 2,100.

Example V

In another ethylene/hydrogen cyanide copolymerization conducted in a manner similar to that of Example I, the reactor is charged with 100 parts of benzene, 5 parts of hydrogen cyanide, 5 parts of dibenzoyl peroxide, and 130 parts of ethylene. The polymerization is conducted at 80° C. under an ethylene pressure of 12,000 lb./sq. in. for 12 hours.

The crude reaction product isolated as in Example I amounts to 32 parts of a light tan solid. On ether extraction of this solid there is separated 5 parts of wax containing 75.4% carbon, 9.3% hydrogen, and 2.4% nitrogen. Extraction of the residue from the ether extraction with benzene yields another 5 parts of wax having 83.3% carbon, 13.2% hydrogen, and 1.4% nitrogen, and having a molecular weight of 900. The undissolved residue from the ether and benzene extractions which is soluble in hot xylene amounts to 22 parts and contains 83.9% carbon, 13.5% hydrogen, and 0.7% nitrogen.

Example VI

A silver-lined reaction vessel is filled to one-eighth of its volume with 50 parts of benzene and 0.5 part of silver (6%) precipitated on calcium carbonate and the air exhausted. The vessel is agitated at 150° C. under 10,000 lb./sq. in. ethylene pressure while injecting a solution of 4 parts of di(tertiary-butyl) peroxide, 13 parts of hydrogen cyanide, and 0.6 part of sulfur dioxide in 80 parts of benzene during 4 hours. After a total of 5 hours at 150° C. the reaction mixture is cooled and removed from the reactor.

The reaction mixture is worked up in the manner described in Example IV and there is obtained 40 parts of a wax which is an ethylene/hydrogen cyanide copolymer containing 1.6% nitrogen and having an average molecular weight of 2,700.

Example VII

In a copolymerization similar to that of Example VI the reaction vessel is charged with 50 parts of methanol, and ethylene under a pressure of 10,000 lb./sq. in. is introduced. A solution of 14 parts of hydrogen cyanide and 3.5 parts of di(tertiary-butyl) peroxide in 80 parts of methanol is then injected into the reaction vessel during 4 hours at 150° C.

The product isolated as in Example VI is a copolymer of hydrogen cyanide and ethylene having an average molecular weight of 1800 and containing 83.3% carbon, 14.4% hydrogen, 1.1% oxygen, and 1.2% nitrogen.

Example VIII

In a copolymerization carried out by the general process of Example I the reactor is charged with 100 parts of water, 3 parts of di(tertiary-butyl) peroxide, 2 parts of sodium dodecyl sulfate, 5.0 parts of nickel cyanide, and 20 parts of hydrogen cyanide. The polymerization is carried out at 130° C. for 4 hours and at 140° C. for 2 hours under 12,000 lb./sq. in. ethylene pressure.

The product isolated from the reaction mixture by the method of Example IV consists of 18 parts of hydrogen cyanide/ethylene copolymer. This polymer is soluble in hot benzene and contains 80.3% carbon, 13.0% hydrogen, 5.0% oxygen, and 1.73% nitrogen.

Example IX

A silver-lined reaction vessel is charged under nitrogen with 50 parts of benzene and 100 parts of propylene. While agitating the reaction vessel at 175° C., a solution of 15 parts of hydrogen cyanide, 3.5 parts of di(tertiary-butyl) peroxide, and 0.4 part of sulfur dioxide in 80 parts of benzene is injected during a period of 2 hours. The pressure during the reaction is 1500 lb./sq. in. At the end of 2½ hours (total reaction time) the mixture is cooled to room temperature and filtered.

After removing the benzene and excess hydrogen cyanide from the filtrate, the residue is distilled to yield a colorless oil containing 4.3% nitrogen having a molecular weight of 215. The nondistillable residue, amounting to 5 parts, is a wax containing 4.7% nitrogen and having a molecular weight of 520. Both of these products are copolymers of propylene and hydrogen cyanide.

Example X

Another polymerization is carried out in a manner similar to that of Example IX with the exception that the propylene is replaced with an equal amount of vinyl acetate.

The product obtained is 40 parts of a clear resinous copolymer of vinyl acetate and hydrogen cyanide containing 67.5% carbon, 10.2% hydrogen, 0.10% nitrogen and 21.7% oxygen.

Example XI

A silver-lined reaction vessel is charged with a mixture of 100 parts of benzene, 15 parts of hydrogen cyanide, 2.5 parts of di(tertiary-butyl) peroxide, 1 part of acetic anhydride, and 75 parts of ethylene. The reaction mixture is heated at 150° C. and agitated for 6 hours at a pressure of 4500 lb./sq. in.

After cooling and removal from the reactor, the reaction mixture is steam distilled to remove the solvent, the residue is extracted with ether, the ether extract dried, and the ether then removed. The residue is distilled and there is obtained a colorless oil, one fraction of which boils at 80–83° C. at 4 microns and which contains 72.4% carbon, 11.0% hydrogen, and 10.0% nitrogen. This ethylene/hydrogen cyanide copolymer has an average molecular weight of 250.

Example XII

A silver-lined reaction vessel is charged with a mixture of 100 parts of benzene, 15 parts of hydrogen cyanide, 4 parts of di(tertiary-butyl) peroxide, and 0.5 part of sulfur dioxide under an atmosphere of nitrogen. The vessel is closed, cooled to −70° C., evacuated, 100 parts of vinyl chloride introduced, and the reactor then agitated at a temperature of 130° C. and a pressure of 500 lb./sq. in. for 6 hours.

The reaction mixture is diluted with 265 parts of benzene, heated to boiling, filtered and the filtrate cooled to 20° C. The precipitated copolymer of vinyl chloride and hydrogen cyanide is removed by filtration and dried. A yield of 20 parts of polymer containing 49.3% chlorine and 0.7% nitrogen is obtained.

Example XIII

In a copolymerization carried out by the general process of Example I, the reactor is charged with 100 parts of benzene, 15 parts of hydrogen cyanide, and 5 parts of silver (8.3%) on carbon. The polymerization is carried out at 250° C. for 8 hours at 13,000 lb./sq. in. ethylene pressure using ethylene containing 10 parts per million of oxygen.

The reaction mixture is filtered hot and the filtrate is evaporated, leaving as a residue a waxy copolymer of ethylene and hydrogen cyanide containing 79.9% carbon, 12.8% hydrogen, and 5.1% nitrogen, and having an average molecular weight of 1,050. These data indicate an ethylene/hydrogen cyanide mole ratio of 9/1.

Ethylenically unsaturated monomers which undergo addition polymerization are organic compounds which contain the group >C=C< and which are recognized as being capable of undergoing a polymerization reaction involving addition across the ethylenic double bond, which reaction is catalyzed by free radical-generating polymerization initiators. The examples have illustrated this invention with specific reference to copolymers of hydrogen cyanide with ethylene, propylene, vinyl acetate, and vinyl chloride. However, the products of this invention include copolymers of hydrogen cyanide with isobutylene, vinyl fluoride, vinylidene fluoride, tretrafluoroethylene, vinyl propionate, methyl vinyl ketone, styrene, acrylic acid, methyl acrylate, acrylonitrile, and other ethylenically unsaturated polymerizable compounds. Such ethylenically unsaturated polymerizable compounds which are operable in the present invention include olefins, both aliphatic mono- and diolefins, e. g., ethylene, propylene, butylene and butadiene; vinyl and vinylidene halides, e. g., vinyl fluoride, and vinylidene chloride; vinyl ester monomers which undergo addition polymerization, e. g., vinyl benzoate, vinyl isobutyrate, vinyl laurate; vinyl ketones, e. g., ethyl vinyl ketone and methyl isopropenyl ketone; acrylic and methacrylic acids and their derivatives such as esters, nitriles and anhydrides, e. g., ethyl acrylate, methyl methacrylate, methacrylonitrile, and methacrylic acid; butenedioic acids and their derivatives, e. g., maleic and fumaric acids, their esters, nitriles, and anhydrides; substituted ethylenes such as trifluoroethylene, chlorotrifluoroethylene, and styrene. Combinations of two or more as well as any one of these unsaturated compounds are useful for copolymerization with hydrogen cyanide in the practice of this invention. Ethylenically unsaturated monomers containing at least one terminal methylene group and which undergo addition polymerization are preferred for polymerization with hydrogen cyanide in the practice of this invention since the most satisfactory results with respect to yield and polymer quality are obtained when such compounds are used.

Free radical-generating polymerization initiators are organic polymerization catalysts which generate free radicals under polymerization conditions and are capable of initiating conventional vinyl polymerizations. Such compounds generate free radicals by thermal or photodecomposition under the polymerization conditions. A class of such initiators which are especially useful in the process of this invention are compounds having the formula RXXR', wherein R is a monovalent organic radical, R' is a monovalent organic radical or hydrogen, and X is nitrogen or oxygen. Compounds of the above general formula in which X is oxygen are the peroxy polymerization initiators. Specific examples of these include the dialkyl peroxides, e. g., di(tertiary-butyl) peroxide and diethyl peroxide; diacyl peroxides, e. g., diacetyl peroxide, dibenzoyl peroxide, and dilauroyl peroxide; dicarbonyl peroxides, e. g., dibenzal peroxide, methyl ethyl ketone peroxide; hydroperoxides such as tertiary-butyl hydroperoxide, cyclohexyl hydroperoxide; and the peracids, e. g., peracetic acid, perbenzoic acid, and perphthalic acid.

Free radical-generating initiators of the formula RXXR' in which X is nitrogen are the azo polymerization initiators wherein the acyclic azo, —N=N—, group is bonded from both of the nitrogens to discrete carbons. A particularly preferred type of azo compound for use as initiators in the process of this invention is the class of organic azo compounds containing an acyclic azo group having bonded to each nitrogen a discrete carbon atom of the class consisting of aliphatic and cycloaliphatic carbon atoms, at least one of said discrete carbon atoms being tertiary and one of the carbon atoms bonded to said tertiary carbon atom having its remaining valences satisfied only by elements of the class consisting of oxygen and nitrogen as described in U. S. Patent 2,471,959 to M. Hunt. Specific examples of suitable azo initiators include alpha, alpha'-azodiisobutyronitrile, 1,1'-azodicyclohexanecarbonitrile, dimethyl alpha,alpha'-azodiisobutyrate, alpha,-alpha'-azodiisobutyramide, and alpha-(carbamylazo)isobutyronitrile.

Another type of initiator, illustrated in Example XIII, is oxygen which in low concentrations, i. e. less than 100 parts per million, will initiate the polymerization of hydrogen cyanide with ethylenically unsaturated comonomers to useful products when used at high temperatures, i. e. above 200° C., in the absence of other initiators.

Although the use of an added reaction medium is not essential to operability, an inert liquid is usually added with the reactants. Suitable types of solvents which can be used in the solution polymerization of hydrogen cyanide with ethylenically unsaturated polymerizable compounds include hydrocarbons, alcohols, ethers, and mixtures of these with water. Specific examples of suitable solvents include benzene, toluene, xylene, cyclohexane, decahydronaphthalene, methanol, ethanol, 2-propanol, 2-methyl-1-propanol, diethyl ether, dioxane, methanol-water and 2-methyl-2-propanol-water. The polymerization process of this invention can also be carried out by the emulsion polymerization process in which case water containing a suitable surface-active agent serves as the reaction medium. In the cases where water is present in the system a portion of the imino groups may be hydrolyzed, especially at elevated temperature and the resulting copolymers will contain carbonyl groups in place of some or all of the original ketimino,

Best results are obtained in carrying out the process of this invention when the monomeric reactants are of good quality. The reactants should be free of all basic materials which cause self-condensation of hydrogen cyanide. Although oxygen in low concentrations is a polymerization initiator at high temperatures, i. e., above 200° C., it is an undesirable contaminant in vinyl polymerizations at lower temperatures in the presence of peroxide initiators when present in large amounts and for this reason it is preferred to have less than 100 parts per million of oxygen present in the reactants. Since water may cause hydrolysis of the primary imino groups in the polymers especially at elevated temperatures the reaction should be carried out under anhydrous conditions if the polyimine is desired. Water contents of less than 0.05% in the reactants are satisfactory in this respect. If, however, the polycarbonyl compound is desired water may be used as a reaction medium.

Although they are not essential to the operability of the copolymerization process of this invention, certain types of additives in the polymerization system have a beneficial effect on the yield, quality, and nitrogen content of the copolymers produced, and the use of these constitutes a preferred embodiment of the present invention. Two particular classes of additives are useful in this respect. The first of these is the group of metals and their salts which form complexes with amines or ammonia and with hydrogen cyanide, e. g., copper, nickel, cobalt, silver, mercury, and platinum. These additives are conviently employed in the form of the metal precipitated on a carrier such as calcium carbonate or as suitable salts such as cyanides, chlorides, acetates, sulfides, etc. The second class of additives comprises organic and inorganic acids and their anhydrides. Specific additives of this type which are operable include acetic acid, benzoic acid, acetic anhydride, hydrogen chloride, sulfur dioxide, sulfuric acid, and the like. Additives of these types are especially effective when used in amounts ranging from 1% to 10% of the weight of the hydrogen cyanide.

The properties of the hydrogen cyanide copolymers provided by this invention vary widely depending on the particular comonomers and the proportions in which they are used, the nature and amount of the reaction medium employed, the reaction temperature and pressure, and the nature and amount of initiator employed. In view of this variation in the properties of the copolymers produced by this invention, they are useful in a wide variety of applications. For example, they are useful as adhesives, plasticizers, protective coatings, etc. They are especially valuable as chemical intermediates. For example, these hydrogen cyanide copolymers having imino groups attached directly to a carbon of the polymer chain can be hydrogenated to polyamines and the resulting polyamines are soluble in dilute acid. The products of this invention are also useful for conversion by reaction with formaldehyde to resins useful as molding compositions and as plywood adhesives.

The copolymers of hydrogen cyanide with monoolefinic aliphatic hydrocarbons possess a combination of properties which makes them an especially valuable embodiment of this invention. Such copolymers range from liquids or soft waxes to hard waxes melting as high as 100° C. Products range from colorless to brown and are normally soluble in hydrocarbons such as benzene, toluene, xylene, hexane, cyclohexane, etc., and are slightly soluble in ethers and are insoluble in water and alcohols.

As many apparently widely different embodiments of this invention may be made without departing from the spirit and scope thereof, it is to be understood that this invention is not limited to the specific embodiments thereof except as defined in the appended claims.

I claim:

1. A copolymer of from 0.5 to 50.0 mole percent of hydrogen cyanide with from 99.5 to 50.0 mole percent of an ethylenically unsaturated monomer which undergoes addition polymerization, said copolymer containing recurring imino groups directly attached through nitrogen thereof by a double bond to a carbon atom of the main polymer chain.

2. A copolymer of from 0.5 to 50.0 mole percent of hydrogen cyanide with from 99.5 to 50.0 mole percent of an ethylenically unsaturated monomer containing at least one terminal methylene group and which undergoes addition polymerization, said copolymer containing recurring imino groups directly attached through nitrogen thereof by a double bond to a carbon atom of the main polmer chain.

3. A copolymer of from 0.5 to 50.0 mole percent of hydrogen cyanide with from 99.5 to 50.0 mole percent of an olefin which undergoes addition polymerization, said copolymer containing recurring imino groups directly atached through nitrogen thereof by a double bond to a carbon atom of the main polymer chain.

4. A copolymer of from 0.5 to 50.0 mole percent of hydrogen cyanide with from 99.5 to 50.0 mole percent of a vinyl ester monomer which undergoes addition polymerization, said copolymer containing recurring imino groups directly attached through nitrogen thereof by a double bond to a carbon atom of the main polymer chain.

5. A copolymer of from 0.5 to 50.0 mole percent of hydrogen cyanide with from 99.5 to 50.0 mole percent of a monoolefin which undergoes addition polymerization, said copolymer containing recurring imino groups directly attached through nitrogen thereof by a double bond to a carbon atom of the main polymer chain.

6. A copolymer of from 0.5 to 50.0 mole percent of hydrogen cyanide with from 99.5 to 50.0 mole percent of ethylene, said copolymer containing recurring imino groups directly attached through nitrogen thereof by a double bond to a carbon atom of the main polymer chain.

7. A copolymer of from 0.5 to 50.0 mole percent of hydrogen cyanide with from 99.5 to 50.0 mole percent of propylene, said copolymer containing recurring imino groups directly attached through nitrogen thereof by a double bond to a carbon atom of the main polymer chain.

8. A copolymer of from 0.5 to 50.0 mole percent of hydrogen cyanide with from 99.5 to 50.0 mole percent of vinyl acetate, said copolymer containing recurring imino groups directly attached through nitrogen thereof by a double bond to a carbon atom of the main polymer chain.

9. A copolymer of from 0.5 to 50.0 mole percent of hydrogen cyanide with from 99.5 to 50.0 mole percent of vinyl chloride, said copolymer containing recurring imino groups directly attached through nitrogen thereof by a double bond to a carbon atom of the main polymer chain.

10. A process for the preparation of hydrogen cyanide copolymers which comprises contacting hydrogen cyanide with from 1 to 200 moles per mole of hydrogen cyanide of an ethylenically unsaturated monomer which undergoes addition polymerization and subjecting the mixture of said hydrogen cyanide and ethylenically unsaturated monomer to a temperature of from 0° to 400° C. under a pressure ranging from 500 to 150,000 lb./sq. in., in the presence of a free radical-generating polymerization initiator.

11. A process for the preparation of hydrogen cyanide copolymers as set forth in claim 10 in which said free radical-generating polymerization initiator is a peroxy polymerization initiator.

12. A process for the preparation of hydrogen cyanide copolymers as set forth in claim 10 in which said free radical-generating polymerization initiator is an azo polymerization initiator.

13. A process for the preparation of hydrogen cyanide copolymers as set forth in claim 10 in which said initiator is oxygen and the polymerization is carried out at a temperature of from 200° to 400° C.

14. A process for the preparation of hydrogen cyanide copolymers which comprises contacting hydrogen cyanide with from 5 to 60 moles per mole of hydrogen cyanide of an ethylenically unsaturated monomer which undergoes addition polymerization and subjecting the mixture of said hydrogen cyanide and ethylenically unsaturated monomer to a temperature of from 30° to 250° C. under a pressure ranging from 4,500 to 45,000 lb./sq. in., in the presence of a free radical-generating polymerization initiator.

15. A process for the preparation of hydrogen cyanide copolymers which comprises contacting hydrogen cyanide with from 5 to 60 moles per mole of hydrogen cyanide of an olefin which undergoes addition polymerization and subjecting the mixture of said hydrogen cyanide and olefin to a temperature of from 30° to 250° C. under a pressure ranging from 4,500 to 45,000 lb./sq. in., in the presence of a free radical-generating polymerization initiator.

16. A process for the preparation of hydrogen cyanide copolymers which comprises contacting hydrogen cyanide with from 5 to 60 moles per mole of hydrogen cyanide of a vinyl ester monomer which undergoes addition polymerization and subjecting the mixture of said hydrogen cyanide and vinyl ester monomer to a temperature of from 30° to 250° C. under a pressure ranging from 4,500 to 45,000 lb./sq. in., in the presence of a free radical-generating polymerization initiator.

17. A process for the preparation of hydrogen cyanide copolymers which comprises contacting hydrogen cyanide with from 5 to 60 moles per mole of hydrogen cyanide of ethylene and subjecting the mixture of said hydrogen cyanide and ethylene to a temperature of from 30° to 250° C. under a pressure ranging from 4,500 to 45,000 lb./sq. in., in the presence of a free radical- generating polymerization initiator.

18. A process for the preparation of hydrogen cyanide copolymers as set forth in claim 10 in which said ethylenically unsaturated monomer which undergoes addition polymerization is ethylene.

19. A process for the preparation of hydrogen cyanide copolymers as set forth in claim 10 in which said ethylenically unsaturated monomer which undergoes addition polymerization is propylene.

20. A process for the preparation of hydrogen cyanide copolymers as set forth in claim 10 in which said ethylenically unsaturated monomer which undergoes addition polymerization is vinyl acetate.

21. A process for the preparation of hydrogen cyanide copolymers as set forth in claim 10 in which said ethylenically unsaturated monomer which undergoes addition polymerization is vinyl chloride.

DAVID W. WOODWARD.

REFERENCES CITED

The following references are of record in the file of this patent:

UNITED STATES PATENTS

| Number | Name | Date |
|---|---|---|
| 2,456,428 | Parker | Dec. 14, 1948 |
| 2,478,066 | Van Peski | Aug. 2, 1949 |

OTHER REFERENCES

Schmidt and Marlies: "High Polymer Theory and Practice," McGraw-Hill (1948), pages 119–123.